(12) United States Patent
Tinnin

(10) Patent No.: US 7,798,037 B2
(45) Date of Patent: Sep. 21, 2010

(54) WEDGE ARM POSITIVE RAKE LOCK

(75) Inventor: Melvin Lee Tinnin, Clio, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 267 days.

(21) Appl. No.: 12/133,937

(22) Filed: Jun. 5, 2008

(65) Prior Publication Data

US 2009/0199673 A1 Aug. 13, 2009

Related U.S. Application Data

(60) Provisional application No. 61/065,030, filed on Feb. 8, 2008.

(51) Int. Cl.
*B62D 1/18* (2006.01)
(52) U.S. Cl. .......................... 74/493; 280/775; 280/777
(58) Field of Classification Search .................. 74/492, 74/493; 280/775, 777
See application file for complete search history.

(56) References Cited

U.S. PATENT DOCUMENTS

| | | | |
|---|---|---|---|
| 2,185,779 A | 1/1940 | Tveidt | |
| 5,531,317 A * | 7/1996 | Tomaru | 280/775 |
| 5,979,938 A * | 11/1999 | Menjak et al. | 280/775 |
| 7,021,660 B2 * | 4/2006 | D'Agostino et al. | 280/775 |
| 2007/0295144 A1 | 12/2007 | Nishioka et al. | |
| 2008/0023952 A1 * | 1/2008 | Manwaring et al. | 280/777 |

FOREIGN PATENT DOCUMENTS

JP 2005-153831 6/2005

* cited by examiner

*Primary Examiner*—Richard W Ridley
*Assistant Examiner*—Terence Boes
(74) *Attorney, Agent, or Firm*—Cantor Colburn LLP

(57) ABSTRACT

A steering column assembly includes a column jacket coupled to a mounting bracket, with the column jacket pivotably movable about a pivot axis relative to the mounting bracket. A wedge arm is pivotably mounted to one of the column jacket and the mounting bracket and wedges against the other of the column jacket and the mounting bracket. The wedge arm prohibits the pivotable movement of the column jacket relative to the mounting bracket in response to an impact event. The wedge arm includes an arcuate shape having a variable radial distance between a pivot attachment point and a contact edge. The variable radial distance permits the wedge arm to fit between components of the column jacket and the mounting bracket when the column jacket is positioned in different positions relative to the mounting bracket.

14 Claims, 5 Drawing Sheets

US 7,798,037 B2

WEDGE ARM POSITIVE RAKE LOCK

CROSS REFERENCE TO RELATED APPLICATION

This application claims the benefit of U.S. Provisional Patent Application Ser. No. 61/065,030 filed on Feb. 8, 2008, the disclosure of which is hereby incorporated by reference.

BACKGROUND OF THE INVENTION

1. Field of the Invention

The subject invention generally relates to s steering column assembly for a vehicle, and more specifically to an adjustable steering column assembly pivotably movable about a pivot axis.

2. Description of the Prior Art

Adjustable steering column assemblies often adjust in one or both of a telescoping direction along a longitudinal axis and in a tilt direction about a tilt (rake) axis. In order to meet crashworthiness requirements under some circumstances, it is necessary to prevent the steering column assembly from moving upward or pivoting into the instrument panel of a vehicle in response to an impact event, i.e., a crash event. In other words, it is necessary to prevent movement of the steering column assembly in the tilt direction in the event of the impact event.

Currently, the steering column assemblies incorporate complex and expensive locking devices to lock the steering column assemblies in place and prevent undesirable movement of the steering column assembly in the tilt direction. These locking devices often incorporate small, intricate components that include interlocking teeth to mechanically lock the position of the steering column assembly. However, the interlocking teeth present problems associated with peak-to-peak tooth contact during adjustment. Additionally, the small intricate components complicate assembly of the steering column assembly.

SUMMARY OF THE INVENTION AND ADVANTAGES

The subject invention provides a steering column assembly for a vehicle. The steering column assembly comprises a mounting bracket. The mounting bracket is configured for attachment to the vehicle. A column jacket extends along a longitudinal axis. The column jacket is pivotably coupled to the mounting bracket for pivotable movement relative to the mounting bracket about a pivot axis. A locking mechanism interconnects the mounting bracket and the column jacket. The locking mechanism is movable between a release position and a lock position. The release position permits the pivotable movement of the column jacket relative to the mounting bracket. The lock position secures the position of the column jacket relative to the mounting bracket during normal operation. A wedge arm is pivotably coupled to one of the mounting bracket and the column jacket. The wedge are is in wedging engagement against the other of the mounting bracket and the column jacket when the locking mechanism is in the lock position, thereby preventing the pivotable movement of the column jacket in response to an impact event. The wedge arm is released from the wedging engagement when the locking mechanism is in the release position to permit the pivotable movement.

Accordingly, the subject invention provides the wedge arm to prevent the pivotable movement of the column jacket relative to the mounting bracket in response to the impact event. The wedge lock wedges between the movable column jacket and the stationary mounting bracket. Accordingly, in response to the impact event, the column jacket is prohibited from movement relative to the mounting bracket because the wedge arm is wedged therebetween. Therefore, the steering column assembly need not incorporate the expensive and intricate interlocking toothed mechanisms to prevent the pivotal movement previously utilized in the prior art.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
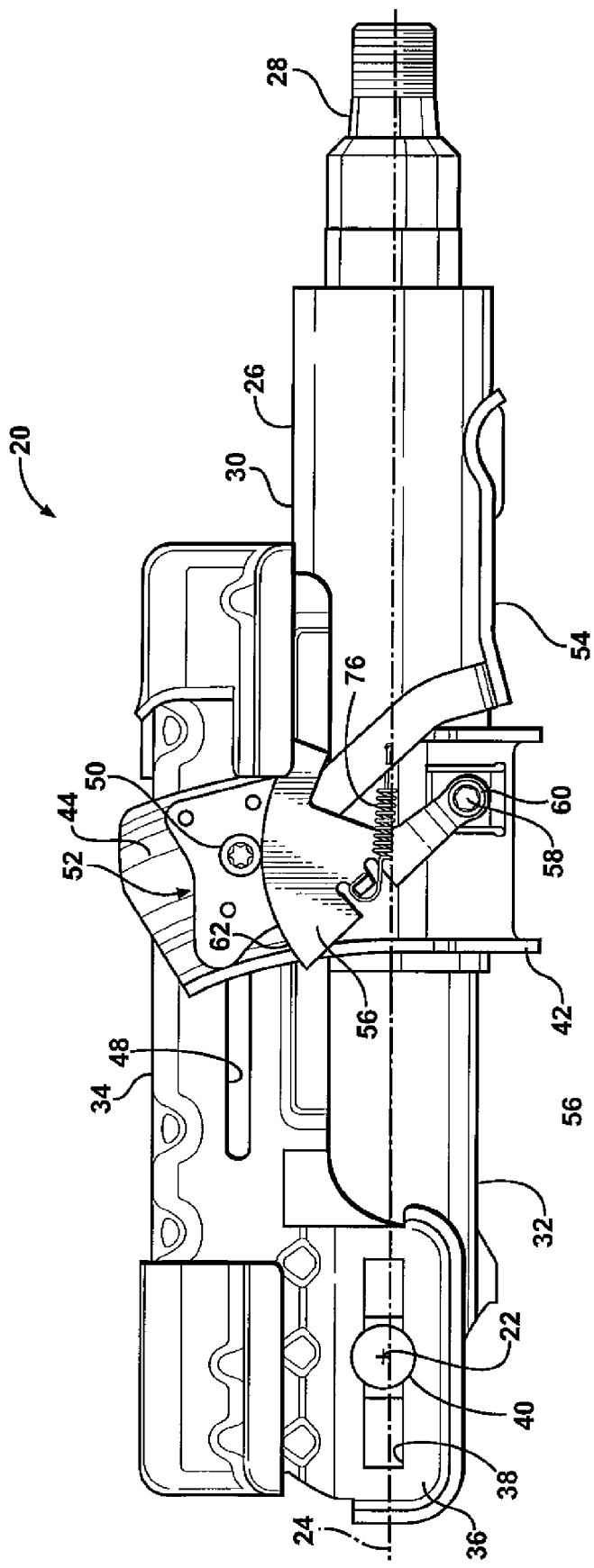
FIG. 1 is side plan view of a steering column assembly.
Figure 2:
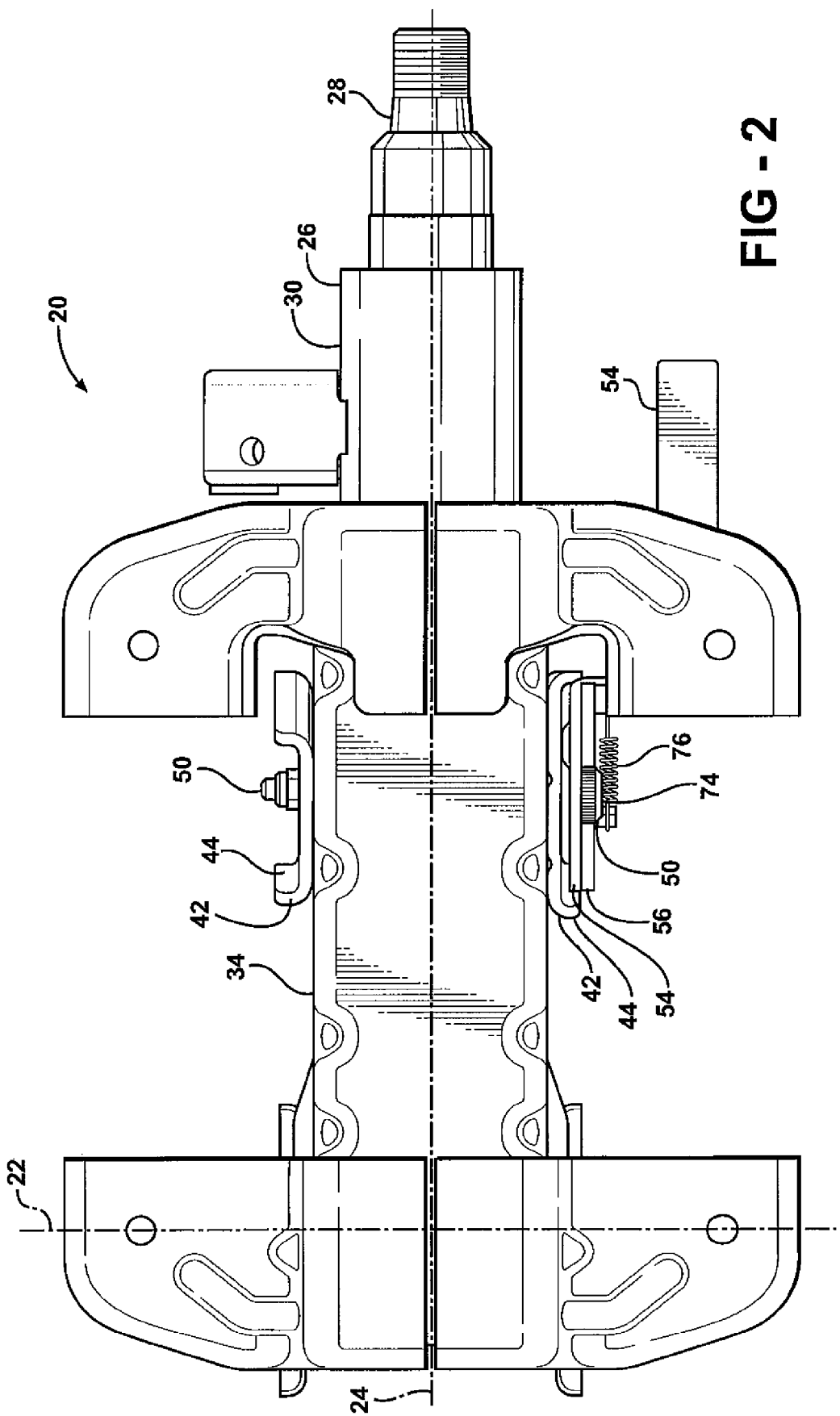
FIG. 2 is a top plan view of the steering column assembly.

Referring to the Figures, wherein like numerals indicate corresponding parts throughout the several views, a steering column assembly is shown generally at 20. Referring to FIGS. 1 and 2, the steering column assembly 20 is for a vehicle, and is pivotable adjustable about a pivot axis 22 The steering column assembly 20 may also be longitudinally adjustable in a telescope direction along a longitudinal axis 24. However, the scope of the subject invention does not require that the steering column assembly 20 be longitudinally adjustable, i.e., telescopically adjustable.

The steering column assembly 20 includes a column jacket 26 extending along the longitudinal axis 24. The column jacket 26 rotatably supports a steering shaft 28 therein. A steering wheel (not shown) is mounted to an upper end of the steering shaft 28 as is well known. As shown, the column jacket 26 includes an upper jacket 30 and a lower jacket 32. However, it should be appreciated that the column jacket 26 may be configured in a manner different than shown or described herein and still fall within the scope of the claims.

The column jacket 26 is coupled to a mounting bracket 34. The mounting bracket 34 is configured for attachment to the vehicle. Accordingly, the mounting bracket 34 mounts the steering column assembly 20 to the vehicle. As shown, the mounting bracket 34 defines a pair of flanges 36 extending downwardly, transverse to the longitudinal axis 24 along opposite sides of the column jacket 26. Each of the pair of flanges 36 defines a first telescope slot 38 extending along the longitudinal axis 24 to permit the longitudinal adjustment of the column jacket 26 relative to the mounting bracket 34. It should be appreciated that the mounting bracket 34 may be configured differently than shown or described herein and still fall within the scope of the claims.

A fastener 40 extends through each of the first telescope slots 38 into engagement with the column jacket 26 to pivotably couple the column jacket 26 to the mounting bracket 34. Each of the fasteners 40 is aligned along and defines the pivot axis 22 about which the column jacket 26 pivots. Accordingly, the column jacket 26 is pivotably movable relative to the mounting bracket 34 about the pivot axis 22.

The fasteners 40 are movable within the first telescope slots 38 during movement of the column jacket 26 in the telescope direction, i.e., the fasteners 40 move with the column jacket 26 as the column jacket 26 moves in the telescope direction. The length of the first telescope slots 38 delimits the limits of the telescopic movement. It should be appreciated that the column jacket 26 may be coupled to the mounting bracket 34 and the pivot axis 22 defined in a manner different than shown or described herein and still fall within the scope of the claims.

A compression bracket 42, commonly referred to as a rake bracket, is fixedly mounted to the column jacket 26 and interconnects the column jacket 26 and the mounting bracket 34. The compression bracket 42 includes a pair of sidewalls 44 extending upwardly along opposing sides of the column jacket 26 transverse to the longitudinal axis 24. Each of the pair of sidewalls 44 defines a rake slot 46 extending transverse, i.e., generally perpendicular to the longitudinal axis 24, to permit the pivotal movement or adjustment about the pivot axis 22 of the column jacket 26 relative to the mounting bracket 34. It should be appreciated that the compression bracket 42 may be configured differently than shown or described herein and still fall within the scope of the claims.

The mounting bracket 34 further defines pair of second telescope slots 48 extending along the longitudinal axis 24 and disposed adjacent the rake slots 46 of the compression bracket 42. A shaft 50, commonly referred to as a rake bolt, extends through the compression bracket 42 and the mounting bracket 34 transverse to the longitudinal axis 24. The shaft 50 may be rotatable for moving a locking mechanism 52 described below, between a lock position and a release position. However, it should be appreciated that the shaft 50 need not be rotatable to fall within the scope of the claims. The shaft 50 extends through the pair of second telescope slots 48 and the rake slots 46. The shaft 50 moves within the rake slots 46 as the compression bracket 42 pivots about the pivot axis 22, i.e., as the column jacket 26 and the compression bracket 42 move during adjustment of the column bracket in the tilt direction, the position of the shaft 50 within the rake slots 46 changes. Accordingly, during the pivotal movement of the column jacket 26, the shaft 50 remains positionally fixed relative to the mounting bracket 34. However, it should be appreciated that the shaft 50 may move with the column jacket 26 during telescopic adjustment of the column jacket 26.

The locking mechanism 52 interconnects the mounting bracket 34 and the column jacket 26. The locking mechanism 52 is movable between the release position and the lock position. The release position permits the pivotable movement of the column jacket 26 relative to the mounting bracket 34. The lock position secures the position of the column jacket 26 relative to the mounting bracket 34 during normal operation. More specifically, the locking mechanism 52 compresses the compression bracket 42 against the mounting bracket 34 when in the lock position and releases the compression bracket 42 from the mounting bracket 34 when in the release position. Accordingly, the locking mechanism 52 retains the desired position of the column jacket 26, and thereby the steering wheel, relative to the mounting bracket 34. However, it should be appreciated that during an impact event, such as a vehicle collision, the locking mechanism 52 may not provide a sufficient clamping force to resist a sudden and severe upward force applied to the steering column assembly 20 by an operator of the vehicle impacting the steering wheel.

A handle 54 is pivotably coupled to one of the mounting bracket 34 and the column jacket 26. The handle may be coupled to the locking mechanism 52 to move the locking mechanism 52 between the release position and the lock position. If the shaft 50 is rotatable, then the handle 54 may be mounted to the shaft 50 for rotating the shaft 50. The locking mechanism 52 may be coupled to the shaft 50, with the locking mechanism 52 being actuated by rotation of the handle 54 about the shaft 50 as is well known. It should be appreciated that there are many types locking mechanisms 52 known in the art. Typically, the locking mechanism 52 includes a cam and a cam follower coupled to the shaft 50 to provide a clamping force. As such, the locking mechanism 52 of the subject invention may include any suitable device capable of clamping the compression bracket 42 and the mounting bracket 34 together to secure the position of the column jacket 26 relative to the mounting bracket 34 as is well known.

Figure 3:
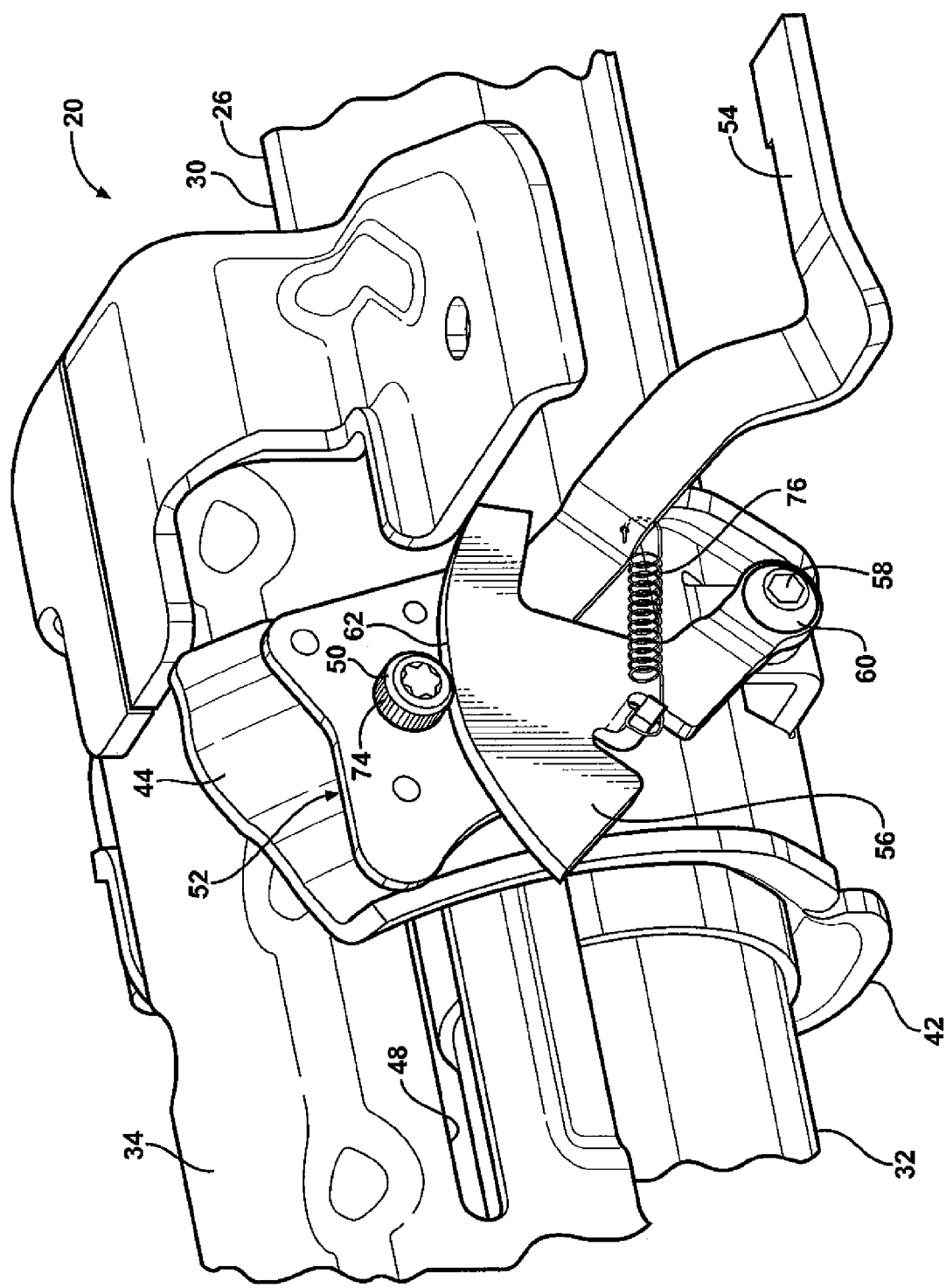
FIG. 3 is an enlarged fragmentary perspective view of the steering column assembly showing a wedge arm.
Figure 4:
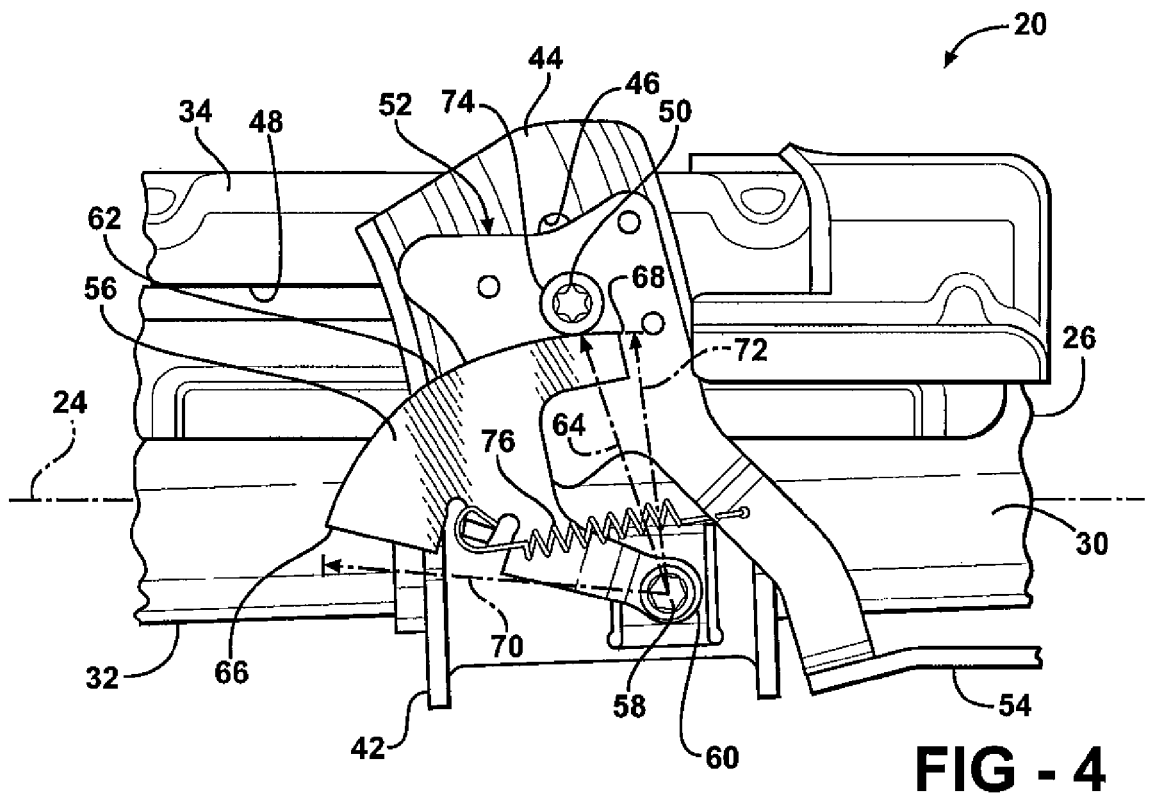
FIG. 4 is an enlarged fragmentary side plan view of the steering column assembly showing the wedge arm locking the steering column assembly in a rake up position.
Figure 5:
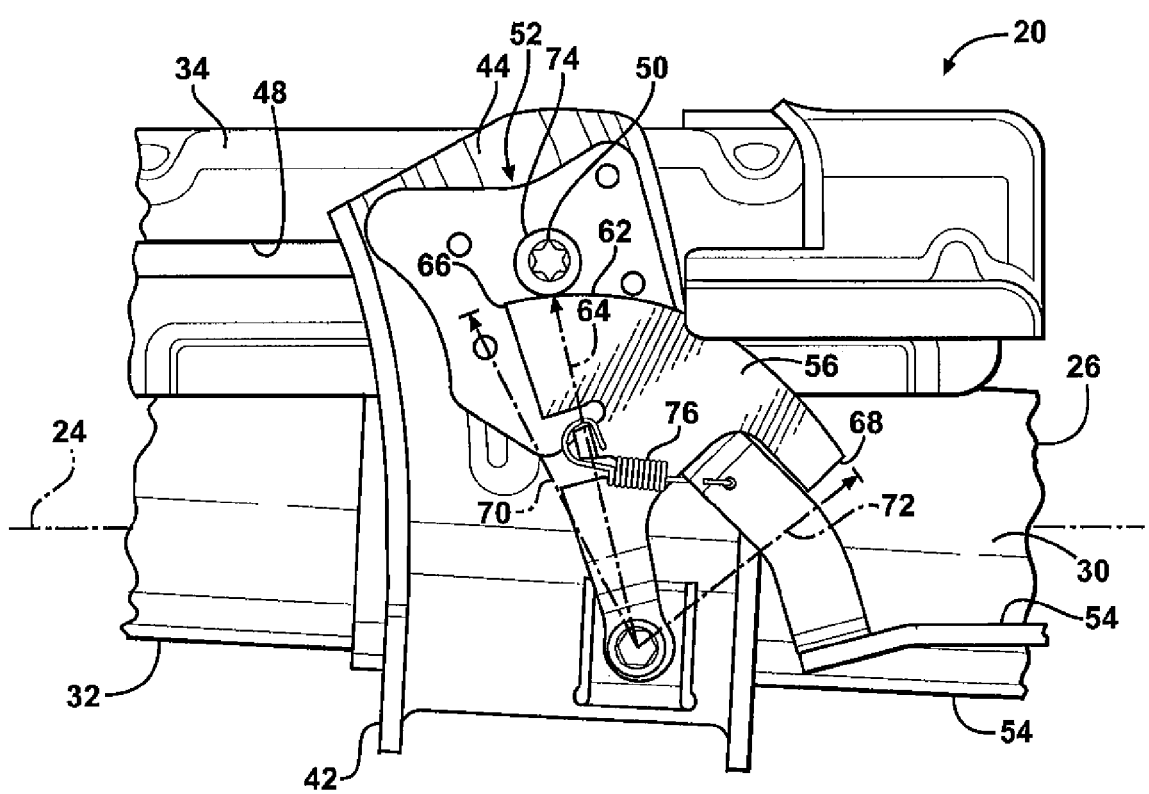
FIG. 5 is an enlarged fragmentary side plan view of the steering column assembly showing the wedge arm locking the steering column assembly in a rake down position.
Figure 6:
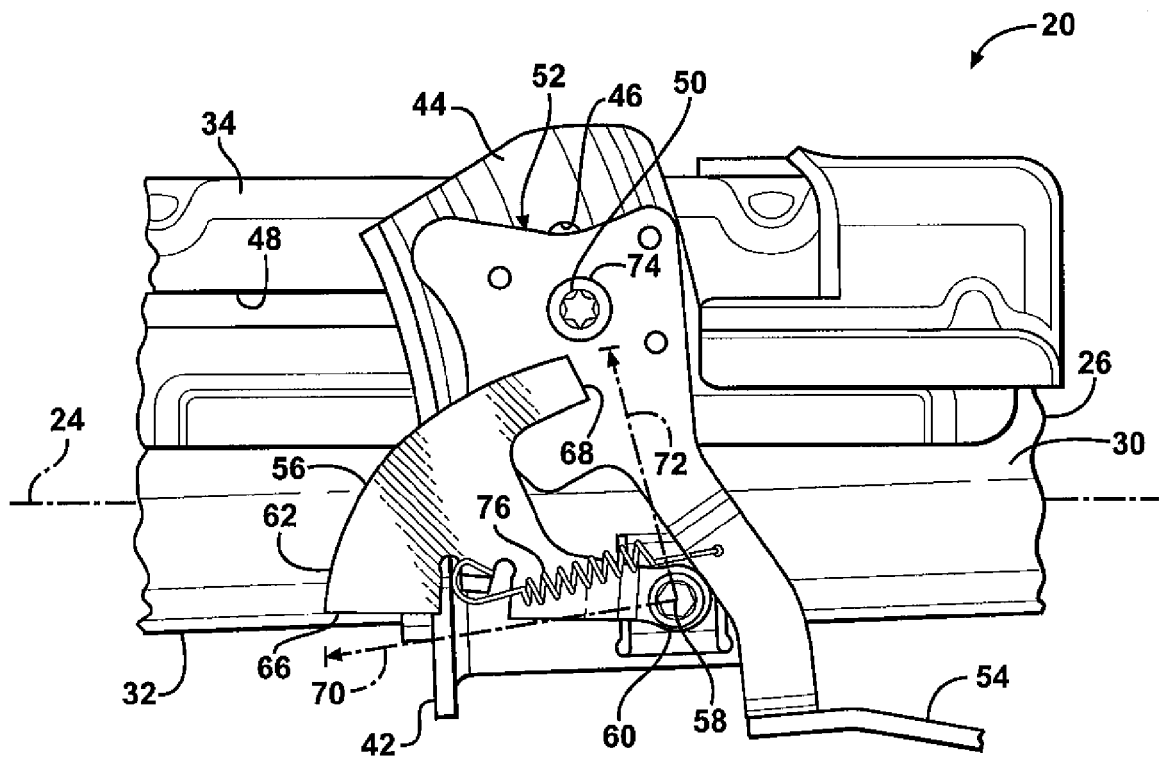
FIG. 6 is an enlarged fragmentary side plan view of the steering column assembly showing the wedge arm disengaged from wedging engagement.

Referring to FIGS. 3 through 6, a wedge arm 56 is pivotably coupled to one of the mounting bracket 34 and the column jacket 26. As shown in FIGS. 3 through 5, the wedge arm 56 is in wedging engagement against the other of the mounting bracket 34 and the column jacket 26 when the locking mechanism 52 is in the lock position. The wedging engagement prevents the pivotable movement of the column jacket 26 in a generally upward direction in response to the impact event. As shown in FIG. 6, the wedge arm 56 is released from the wedging engagement when the locking mechanism 52 is in the release position to permit the pivotable movement.

The wedge arm 56 includes an attachment point 58 pivotably coupling the wedge arm 56 to one of the mounting bracket 34 and the column jacket 26. As shown in the Figures, the attachment point 58 interconnects the wedge arm 56 to the compression bracket 42. Specifically, a pin 60 interconnects the wedge arm 56 and the compression bracket 42 at the attachment point 58. However, it should be appreciated that the wedge arm 56 may be rotatably coupled to one of the mounting bracket 34 and the column jacket 26 in some other manner not shown or described herein.

The wedge further includes a contact edge 62. The contact edge 62 is spaced from the attachment point 58 a radial distance 64. The contact edge 62 wedges against the other of the mounting bracket 34 and the column jacket 26. In other words, the wedge arm 56 is coupled to one of the column jacket 26 and the mounting bracket 34 and the contact edge 62 of the wedge arm 56 wedges against the other of the column jacket 26 and the mounting bracket 34. As shown, the contact edge 62 wedges against the mounting bracket 34.

The radial distance 64 that the contact edge 62 is spaced from the attachment point 58 is variable along a length of the contact edge 62. The variable radial distance 64 of the wedge arm 56 corresponds with different relative positions between the column jacket 26 and the mounting bracket 34. Accordingly, the wedge arm 56 includes a first edge 66 and a second edge 68. The first edge 66 defines a first radial distance 70. The second edge 68 is angularly spaced from the first edge 66 about the attachment point 58 and defines a second radial distance 72. The second radial distance 72 is different from the first radial distance 70. The radial distance 64 of the contact edge 62 from the attachment point 58 varies between the first radial distance 70 and the second radial distance 72.

As shown, the contact edge 62 defines a smooth arcuate shape extending between distal ends of the first edge 66 and the second edge 68.

Because the wedge arm 56 is mounted to the compression bracket 42, the wedge arm 56 moves with the column jacket 26 and the compression bracket 42 during adjustment of the column jacket 26 in the tilt direction about the pivot axis 22. Accordingly, because the shaft 50 does not move with column jacket 26 and the compression bracket 42 during the tilting movement, the distance between the attachment point 58 and the shaft 50 changes in response to adjustment of the column jacket 26 in the tilt direction. As such, in order to maintain engagement between the wedge arm 56 and the head portion 74 of the shaft 50, the wedge arm 56 includes the variable radial distance 64. The variable radial distance 64 of the wedge arm 56 allows for the wedging engagement within the full range of pivotal movement of the column jacket 26 relative to the mounting bracket 34.

A spring 76 is connected to the wedge arm 56 and to the handle 54. The spring 76 provides a biasing force to move the wedge arm 56 into engagement with the mounting bracket 34 upon rotation of the handle 54 into the lock position, i.e., the spring 76 pulls the wedge arm 56 into an abutting relationship with the mounting bracket 34. As the handle 54 is positioned in the release position, the spring 76 releases the biasing force, and allows the wedge arm 56 to rotate about the pin 60, away from the mounting bracket 34 to permit the pivotal movement of the column jacket 26. The handle 54 is configured to engage the wedge arm 56 during rotation into the release position to push against the wedge arm 56 and cause the wedge arm 56 to rotate out of wedging engagement.

As shown, the shaft 50 includes a head portion 74. The head portion 74 extends outward past the handle 54. As described above, the wedge arm 56 is rotatably mounted to the compression bracket 42 by the pin 60 and engages the mounting bracket 34. Specifically, the wedge arm 56 wedges against the shaft 50, and more specifically, the wedge arm 56 wedges against the head portion 74 of the shaft 50. The head portion 74 of the shaft 50 being coupled to the mounting bracket 34 and positionally fixed against generally vertical movement relative to the mounting bracket 34. It should be appreciated, however, that the wedge arm 56 may alternatively wedge against some other portion of the mounting bracket 34 other than the head portion 74 as shown.

Figure 7:
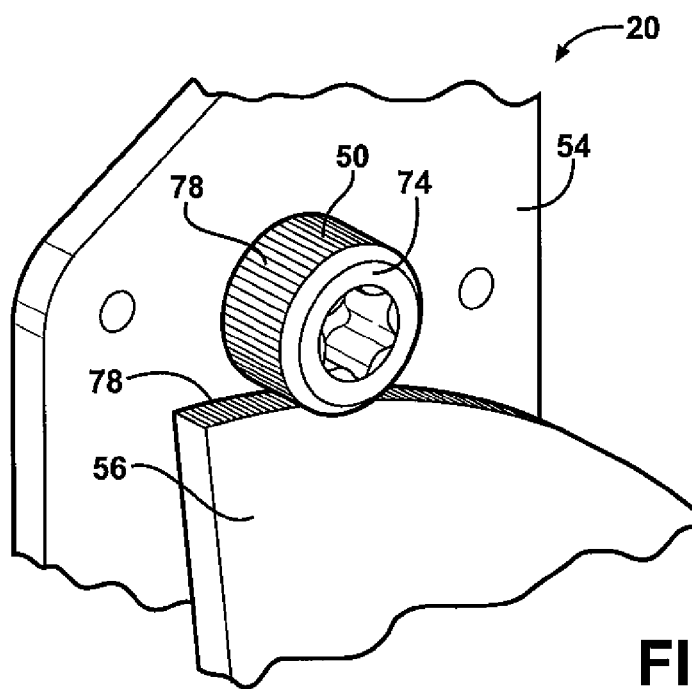
FIG. 7 is an enlarged fragmentary perspective view of the steering column assembly detailing serrations on the wedge arm and on a head portion of a shaft.

The contact edge 62 of the wedge arm 56 and/or the shaft 50 and the head portion 74 of the shaft 50 may include a smooth finish. Alternatively, referring to FIG. 7, the contact edge 62 of the wedge arm 56 and/or the shaft 50 and the head portion 74 of the shaft 50 may be machined to include serrations 78 or ridges to engage each other. The serrations 78 reduce a potential for slippage between the shaft 50 or the head portion 74 of the shaft 50 and the contact edge 62 of the wedge arm 56. Accordingly, it should be appreciated that the contact edge 62 may include serrations 78 for engaging the shaft 50, and/or the shaft 50 may include serrations 78 for engaging the wedge arm 56.

In operation, the column jacket 26 and thereby the compression bracket 42 are positioned in a desired position and the handle 54 is moved into the lock position to secure the position of the column jacket 26. As the handle 54 is moved into the lock position, the spring 76 draws the contact edge 62 of the wedge arm 56 into abutting engagement with the head portion 74 of the shaft 50, thereby wedging the wedge arm 56 between the pin 60 and the shaft 50. The variable radial distance 64 of the wedge arm 56 accommodates all possible positions of the column jacket 26 within the range of the pivotal movement, i.e., as the position of the column jacket 26 is adjusted in the tilt direction, the relative position of the wedge arm 56 to the shaft 50 will change as well, so as to always be in contact with the head portion 74 of the shaft 50. In response to a crash event, the wedge arm 56 prevents undesirable upwardly transverse movement of the column jacket 26 in the pivot direction because the shaft 50 is restricted against vertical movement relative to the column jacket 26, i.e., the shaft 50 is prevented from moving in a direction upwardly transverse to the longitudinal axis 24. This is because the wedge arm 56 is coupled to the compression bracket 42 and wedged against the head portion 74 of the shaft 50.

While the steering column assembly 20 has been described having the shaft 50 vertically restrained from movement, with the wedge arm 56 coupled to the column jacket 26 for vertical movement therewith during the pivotal movement, it should be appreciated that the configuration may be reversed. As such, the wedge arm 56 may be rotatably coupled to the mounting bracket 34 and vertically restrained relative to the column jacket 26, and the shaft 50 movable with the column jacket 26 during the pivotal movement of the column jacket 26. In other words, the attachment point 58 may interconnect the wedge arm 56 to the mounting bracket 34, with the wedge arm 56 wedging against the compression bracket 42.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A steering column assembly for a vehicle, said assembly comprising:
   a mounting bracket configured for attachment to the vehicle;
   a column jacket extending along a longitudinal axis and pivotably coupled to said mounting bracket for pivotable movement relative to said mounting bracket about a pivot axis;
   a locking mechanism interconnecting said mounting bracket and said column jacket and movable between a release position permitting said pivotable movement of said column jacket relative to said mounting bracket and a lock position securing the position of said column jacket relative to said mounting bracket during normal operation; and
   a wedge arm pivotably coupled to one of said mounting bracket and said column jacket and in wedging engagement against the other of said mounting bracket and said column jacket when said locking mechanism is in said lock position to prevent said pivotable movement of said column jacket in a generally upward direction in response to an impact event and released from said wedging engagement when said locking mechanism is in said release position to permit said pivotable movement, wherein said wedge arm includes an attachment point pivotably coupling said wedge arm to one of said mounting bracket and said column jacket, and a contact edge spaced from said attachment point a radial distance for wedging against the other of said mounting bracket and said column jacket, wherein said radial distance is variable along said contact edge to correspond with different relative positions between said column jacket and said mounting bracket, a shaft extending through said compression bracket and said mounting bracket transverse to said longitudinal axis, wherein said contact edge contacts said shaft.

2. An assembly as set forth in claim 1 wherein said wedge arm includes a first edge defining a first radial distance and a second edge angularly spaced from said first edge about said attachment point and defining a second radial distance different from said first radial distance with said radial distance of said contact edge variable between said first radial distance and said second radial distance.

3. An assembly as set forth in claim 2 wherein said contact edge defines an arcuate shape.

4. An assembly as set forth in claim 1 wherein said column jacket includes a compression bracket.

5. An assembly as set forth in claim 4 wherein said attachment point interconnects said wedge arm to said compression bracket.

6. An assembly as set forth in claim 5 further comprising a pin interconnecting said wedge arm and said compression bracket at said attachment point.

7. An assembly as set forth in claim 1 wherein said shaft is rotatable for moving said locking mechanism between said lock position and said release position.

8. An assembly as set forth in claim 7 wherein said locking mechanism is coupled to said shaft and compresses said compression bracket against said mounting bracket when in said lock position and releases said compression bracket from said mounting bracket when in said release position.

9. An assembly as set forth in claim 1 further comprising a handle pivotably coupled to one of said mounting bracket and said column jacket.

10. An assembly as set forth in claim 9 further comprising a spring connected to said wedge arm and said handle for biasing said wedge arm toward said handle.

11. An assembly as set forth in claim 1 wherein said shaft includes a head portion.

12. An assembly as set forth in claim 11 wherein said wedge arm wedges against said head portion.

13. An assembly as set forth in claim 1 wherein said contact edge includes serrations for engaging said shaft.

14. An assembly as set forth in claim 1 wherein said shaft includes serrations for engaging said wedge arm.

* * * * *